(12) United States Patent
Batt et al.

(10) Patent No.: US 12,184,707 B2
(45) Date of Patent: Dec. 31, 2024

(54) INHERITING DIGITAL WHITEBOARD ROLES BASED ON VIDEO CONFERENCE ROLES

(71) Applicant: Zoom Video Communications, Inc., San Jose, CA (US)

(72) Inventors: Palmer Harold Batt, Seattle, WA (US); Raghavendra Bhagavatha, San Jose, CA (US); Alicia Anne-Kepner Brekke, Richmond, VA (US); Minshan Cui, Houston, TX (US); Jeffrey William Smith, Layton, UT (US); Jiabin Xiang, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/161,337

(22) Filed: Jan. 30, 2023

(65) Prior Publication Data

US 2024/0259439 A1 Aug. 1, 2024

(51) Int. Cl.
*H04L 65/403* (2022.01)
*H04L 65/1089* (2022.01)
*H04L 65/1093* (2022.01)

(52) U.S. Cl.
CPC ...... *H04L 65/1089* (2013.01); *H04L 65/1093* (2013.01); *H04L 65/403* (2013.01)

(58) Field of Classification Search
CPC ............. H04L 65/1089; H04L 65/1093; H04L 65/403
See application file for complete search history.

(56) References Cited

U.S. PATENT DOCUMENTS

| | | | |
|---|---|---|---|
| 7,634,546 B1 | 12/2009 | Strickholm et al. | |
| 9,398,059 B2* | 7/2016 | Shepherd | H04L 12/1822 |
| 10,257,196 B2 | 4/2019 | Dang et al. | |
| 10,505,998 B1* | 12/2019 | Ackerman | H04L 65/4015 |
| 11,394,925 B1* | 7/2022 | Faulkner | H04N 21/4316 |
| 11,463,499 B1* | 10/2022 | Fieldman | H04L 65/403 |
| 11,665,284 B2* | 5/2023 | Jorasch | H04L 12/1822 709/204 |
| 11,720,604 B2* | 8/2023 | Bhagavatha | G06F 40/216 707/740 |
| 2008/0184115 A1* | 7/2008 | Back | G06Q 10/00 715/702 |
| 2012/0198358 A1* | 8/2012 | Carrer | G06Q 10/10 715/753 |

(Continued)

*Primary Examiner* — Dhairya A Patel
(74) *Attorney, Agent, or Firm* — Young Basile Hanlon & MacFarlane, P.C.

(57) ABSTRACT

Whiteboard roles controlling levels of access to functionality of a digital whiteboard shared to a video conference for participants of the video conference are inherited based on conference roles of those participants within the video conference. Based on a request to share a digital whiteboard to a video conference, a whiteboard role is determined for each participant of the video conference based on a conference role of the participant within the video conference. For each participant during the video conference, access to functionality of the digital whiteboard corresponding to the whiteboard role determined for the participant is enabled, in which different functionality of the digital whiteboard is enabled for different whiteboard roles.

20 Claims, 8 Drawing Sheets

(56) References Cited

U.S. PATENT DOCUMENTS

| | | | | |
|---|---|---|---|---|
| 2014/0362165 | A1* | 12/2014 | Ackerman | G06Q 10/10 |
| | | | | 348/14.07 |
| 2016/0255127 | A1* | 9/2016 | Baribault | G06F 21/31 |
| | | | | 709/204 |
| 2016/0295167 | A1* | 10/2016 | Sakurai | H04N 7/152 |
| 2018/0007097 | A1* | 1/2018 | Malatesha | H04L 65/1093 |
| 2020/0177864 | A1* | 6/2020 | Kato | H04N 13/111 |
| 2020/0296146 | A1* | 9/2020 | Hinohara | H04L 65/4015 |
| 2021/0352120 | A1* | 11/2021 | Masi | H04L 67/025 |
| 2022/0103566 | A1* | 3/2022 | Faulkner | H04L 67/06 |
| 2023/0247067 | A1* | 8/2023 | Adams | H04L 65/1093 |
| | | | | 709/204 |

* cited by examiner

INHERITING DIGITAL WHITEBOARD ROLES BASED ON VIDEO CONFERENCE ROLES

FIELD

This disclosure relates to digital whiteboards, and, more specifically, to inheriting whiteboard roles controlling levels of access to functionality of a digital whiteboard shared to a video conference for participants of the video conference based on conference roles of those participants within the video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
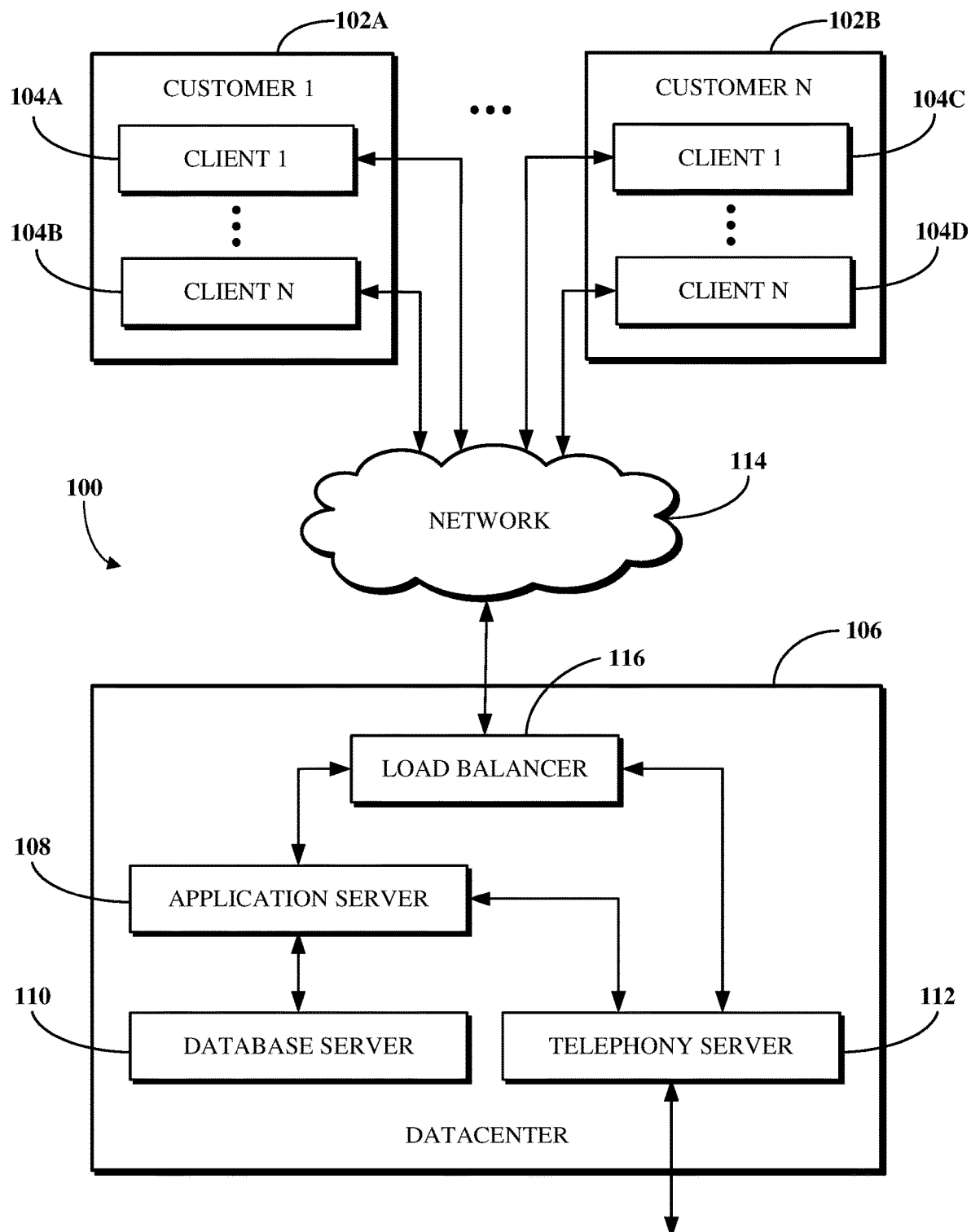
FIG. 1 is a block diagram of an example of an electronic computing and communications system.

A digital whiteboard is a virtual space within which a number of people can collaborate on a project. Users of a digital whiteboard may collaborate by adding, modifying, and/or removing content (e.g., text boxes, drawing spaces, and sticky notes) for current or future consideration by themselves or others. Users of a digital whiteboard may access a digital whiteboard individually, or they may participate in an active digital whiteboard session (i.e., a real-time event in which a digital whiteboard is simultaneously accessed by multiple users) to create documents, brainstorm ideas, and otherwise work together towards a project goal. For example, users of a digital whiteboard may participate in an active digital whiteboard session via a video conference, in which the users are participants to the video conference and the digital whiteboard is shared to the video conference to facilitate the active digital whiteboard session.

A video conference to which a digital whiteboard can be shared to facilitate an active digital whiteboard session enables video-based, real-time communications between participants in one or more locations. In some cases, each of the participants separately connects to a video conference from their own remote locations. In other cases, multiple participants may be physically located in and connect to the video conference from a conference room or similar physical space (e.g., in an office setting) while other conference participants connect to the video conference from one or more remote locations. Conferencing software for implementing a video conference thus enables people to conduct video conferences without requiring them to be physically present with one another. The conferencing software may be available as a standalone software product or it may be integrated within a software platform, such as a unified communications as a service (UCaaS) platform.

Participants to a video conference typically have a conference role assigned to them. Examples of conference roles which may be assigned to participants of a video conference include host (e.g., a video conference participant who is hosting the video conference), presenter (e.g., a video conference participant who shares content to the video conference or who otherwise gives a presentation during the video conference), and participant (e.g., a general audience member of the video conference). Conference roles define the functionality of the video conference which is accessible to the participants. For example, the host conference role may enable a participant to have access to all functionality of the video conference so that the participant can have a highest level of control over the video conference, while the participant conference role may limit the functionality of the video conference to which a participant has access to prevent them from taking certain actions (e.g., sharing content or inviting or removing other participants). The conference role for a given participant is typically assigned by themselves, when they are the creator of the conference, or by another participant of the video conference designating the conference role, when they are invited to the conference by that other participant. For example, a participant may be assigned the host role by creating the video conference. In another example, a participant may be assigned the presenter role by a participant having the host role allowing them to share content or designating them as an active speaker.

Similarly, users of a digital whiteboard, whether as participants to an active digital whiteboard session or as users individually accessing the digital whiteboard outside of such a session, typically have a whiteboard role assigned to them. Examples of whiteboard roles which may be assigned to users of a digital whiteboard include owner (e.g., a digital whiteboard user who created the digital whiteboard), editor (e.g., a digital whiteboard user who is allowed to add, modify, and/or remove content items and/or comments to or from the digital whiteboard), commenter (e.g., a digital whiteboard user who is allowed to add, modify, and/or remove comments to or from the digital whiteboard), and view-only (e.g., a digital whiteboard user who is only allowed to view content items and/or comments of the digital whiteboard). Whiteboard roles thus define the functionality of the digital whiteboard which is accessible to the users. Similar to conference roles, the whiteboard role for a given user is typically assigned by themselves, when they are the creator of the digital whiteboard, or by another user of the digital whiteboard designating the whiteboard role, when they are invited to access the digital whiteboard by that other user. For example, a user may assign themselves the owner role by creating the digital whiteboard. In another example, a user may be assigned the commenter role based on an invitation, from the user having the host role, to comment on content items within the digital whiteboard. Generally, a user may invite others to access a whiteboard in a role that is below (e.g., enables access to less functionality of the digital whiteboard than) their own role.

However, when a digital whiteboard is shared to a video conference (e.g., to initiate an active digital whiteboard session during the video conference), whiteboard roles for the participants of the video conference must be manually assigned. Given that the conference roles for the participants of the video conference have already been manually assigned by that point, conventional approaches to sharing a digital whiteboard to a video conference thus require that participants twice be manually assigned roles. Despite this, because video conferences and digital whiteboards are both collaborative experiences that have similar role types (e.g., host and owner), it would be desirable to leverage conference roles already assigned to participants of a video conference to determine whiteboard roles for those participants when a digital whiteboard is shared to that video conference.

Implementations of this disclosure address problems such as these by inheriting whiteboard roles controlling levels of access to functionality of a digital whiteboard shared to a video conference for participants of the video conference based on conference roles of those participants within the video conference. An active digital whiteboard session is initialized during a video conference based on a request to share a digital whiteboard to the video conference. Based on that request, a whiteboard role is determined for each participant of the video conference corresponding to a conference role of that participant within the video conference. In particular, a mapping of conference roles to whiteboard roles, which may be determined prior to the video conference, is used to determine the whiteboard roles for each participant of the video conference. Based on the whiteboard roles determined for the participants, access to functionality of the digital whiteboard corresponding to those whiteboard roles is enabled for the participants. Different functionality of the digital whiteboard is enabled for different whiteboard roles. In this way, participants to a video conference inherit a whiteboard role based on their conference role during the video conference, and the functionality of the digital whiteboard to which the participants have access during the active digital whiteboard session is thus automatically enabled based on their whiteboard role. The whiteboard roles are revoked upon the termination of the digital whiteboard session, whether before or at the termination of the video conference.

To describe some implementations in greater detail, reference is first made to examples of hardware and software structures used to implement a system for inheriting whiteboard roles for a digital whiteboard shared to a video conference based on conference roles of participants within the video conference. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a unified communications as a service (UCaaS) platform or other software platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server (e.g., a virtual machine). In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
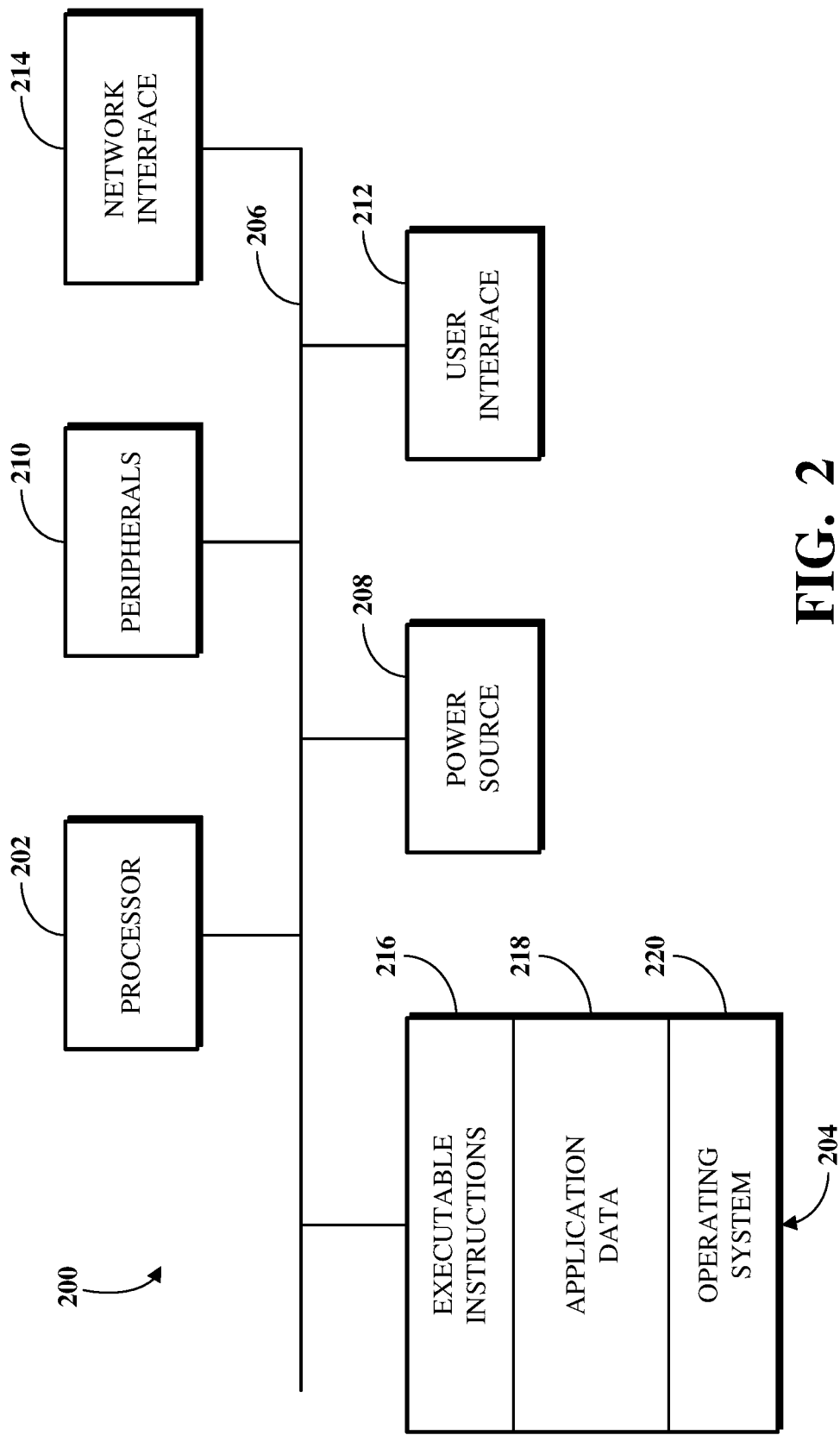
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
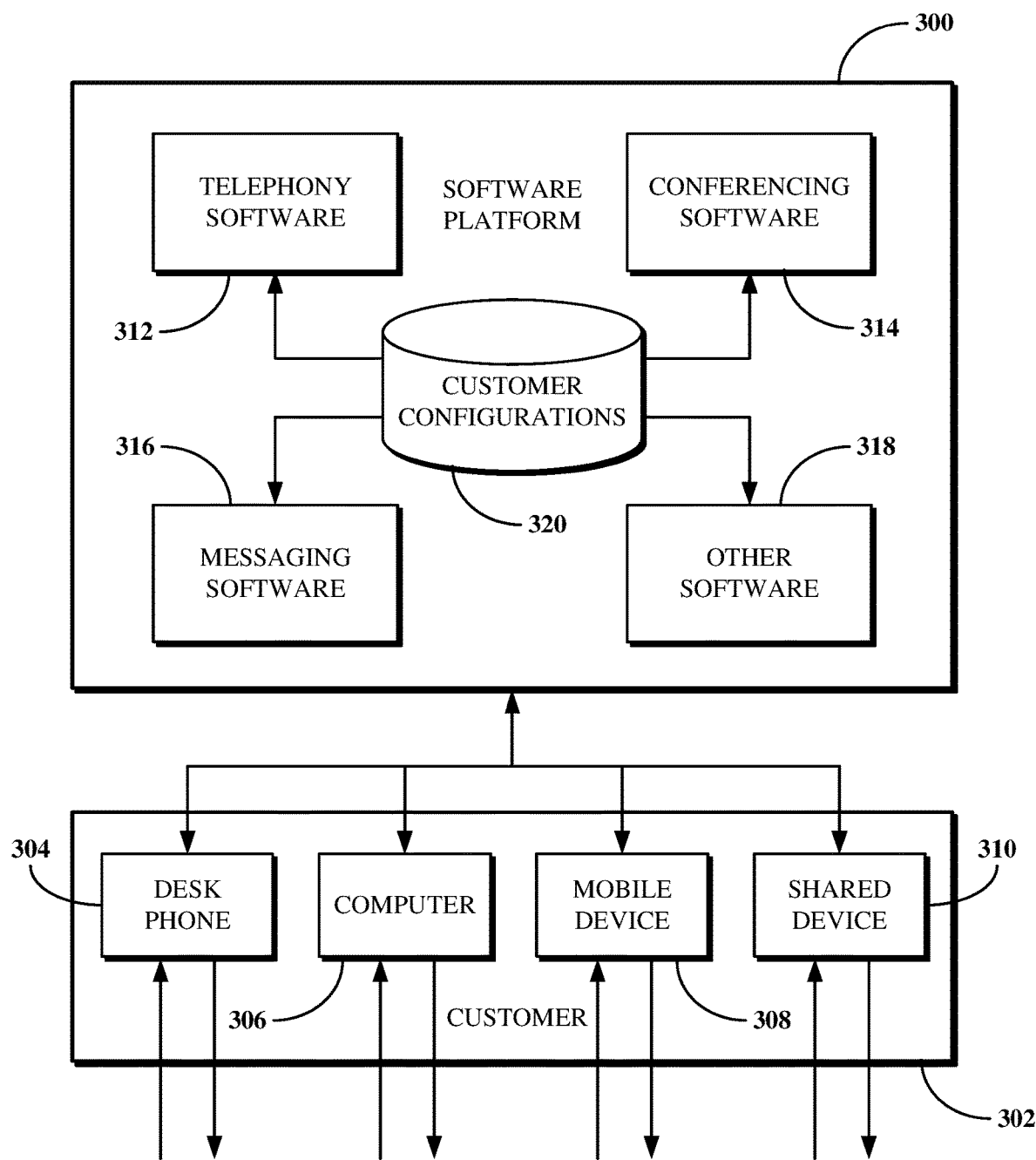
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include digital whiteboard software for accessing and using a digital whiteboard and/or software for whiteboard role inheritance.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
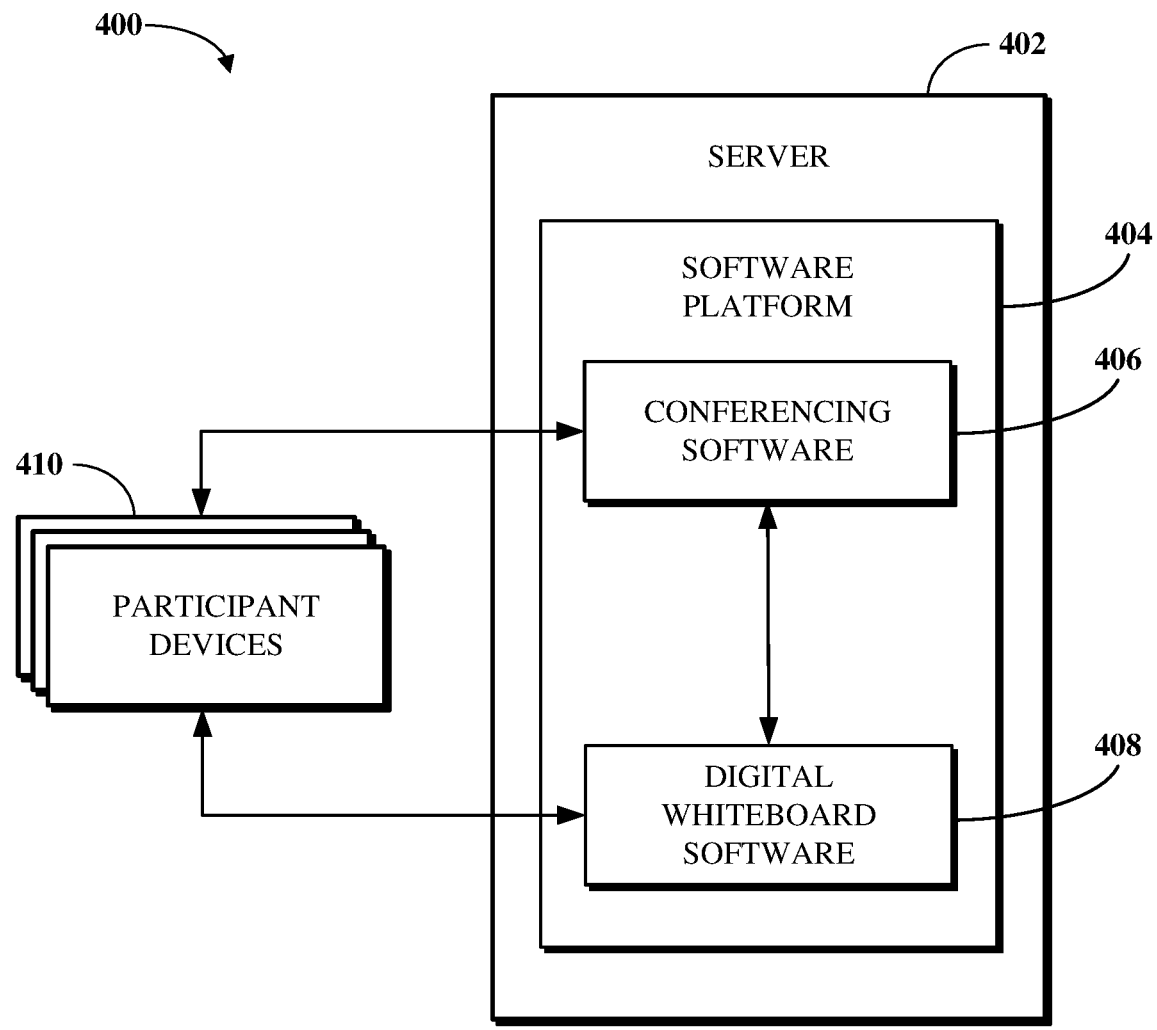
FIG. 4 is a block diagram of an example of a system for sharing a digital whiteboard to a video conference.

FIG. 4 is a block diagram of an example of a system 400 for sharing a digital whiteboard to a video conference. The system 400 includes a server 402 which operates some or all of a software platform 404, which may, for example, be the software platform 300 shown in FIG. 3. As shown, the server 402 operates conferencing software 406 of the software platform 404 and digital whiteboard software 408 of the software platform 404. The conferencing software 406 may, for example, be the conferencing software 314 shown in FIG. 3. The digital whiteboard software 408 may, for example, be the other software 318 shown in FIG. 3. While the conferencing software 406 and the digital whiteboard software 408 are shown as being run on the server 402, in some implementations, the conferencing software 406 and the digital whiteboard software 408 may be run on different servers. In some implementations, the software platform 404 may be omitted.

A number of participant devices 410 are shown. The participant devices 410 are computing devices configured to access a video conference implemented using the conferencing software 406 and/or a digital whiteboard implemented using the digital whiteboard software 408. For example, the participant devices 410 may be client devices, such as ones of the client devices 304 through 310 shown in FIG. 3. A participant device 410 that is a client device may run a client application configured to connect the participant device 410 to a video conference and/or to a digital whiteboard. In another example, the participant devices 410 may be computing devices other than client devices. A participant device 410 that is a computing device other than a client device may use software other than a client application (e.g., a web browser) to connect to a video conference and/or to a digital whiteboard.

The conferencing software 406 implements a video conference over which users of the participant devices 410 can interact in real-time. Implementing a conference includes transmitting and receiving video, audio, and/or other data between the participant devices 410. Each of the participant devices 410 may connect to the conferencing software 406 using separate input streams to enable the users of the participant devices 410 to participate in a video conference together. The various channels used for establishing connections between the participant devices 410 may, for example, be based on the individual device capabilities of the participant devices 410.

The conferencing software 406 includes a user interface tile for each input stream received and processed at the conferencing system 400. An arrangement of the user interface tiles, as well as the sizes of those user interface tiles, may be based on one or both of a type of video conference implemented using the conferencing software 406 (e.g., a participant-to-participant video conference, a contact center engagement video conference, or an online learning video conference, as will be described below) or whether some content is currently being shared to the video conference (e.g., a digital whiteboard, as will be described below).

A conference implemented using the conferencing software 406 may be referred to as a video conference in which video streaming is enabled for the conference participants thereof. The enabling of video streaming for a participant of a video conference does not require that the participant activate or otherwise use video functionality for participating in the video conference. For example, a conference may still be a video conference where none of the participants joining using clients turns on their video stream for any portion of the conference or where video input is disabled for some or all of the participants.

The video conference may be implemented in any of a variety of possible use cases. For example, the video conference can be a participant-to-participant video conference in which participants as end users of the conferencing software 406 may have their own user interface tiles and video streams, connect from their own participant devices (e.g., the participant devices 410), have similar meeting controls, be a host or be granted host privileges, or the like. A participant-to-participant video conference as referred to herein may thus be recognized as a conventional video conference between two or more given people. In another example, the video conference can be a contact center engagement video conference in which one participant to the video conference is a contact center user who is accessing a contact center over a video modality facilitated wholly or partially using the conferencing software 406 and another participant to the video conference is a contact center agent who works with or otherwise for the contact center to address queries from contact center users. In some such cases, the video conference can be implemented within a contact center service to deliver real-time communications over a video modality of the contact center. In yet another example, the video conference can be an online learning video conference in which multiple participants are recognized generally as audience participants and one or more select participants are recognized generally as leader participants. An online learning video conference may, for example, be used for educational purposes (e.g., virtual classes for online-capable schools), webinar purposes, or other lecture- or presentation-type purposes. Other examples of video conference implementations are possible.

The digital whiteboard software 408 implements a digital whiteboard which may be simultaneously accessed by one or more of the participant devices 410. The digital whiteboard software 408 may facilitate an active digital whiteboard session for users of the participant devices 410 to simultaneously collaborate together on a digital whiteboard shared to (and thus during) a video conference implemented using the conferencing software 406. In some cases, the active digital whiteboard session may be initiated while the users of the participant devices 410 are already connected to a video conference implemented using the conferencing software 406. In other cases, the users of the participant devices 410 may be connected to the active digital whiteboard session before a video conference between those users begins.

A digital whiteboard implemented using the digital whiteboard software 408 may be accessed and interacted with by some or all of the participant devices 410 at a given time. For example, one or more of the participant devices 410 may be used to add content items to the digital whiteboard, modify content items within the digital whiteboard, and/or remove content items from the digital whiteboard. Changes to (e.g., additions, modifications, and/or removals of) content items of the digital whiteboard made by one of the participant devices 410 are visible in real-time to all of the participant devices 410. As used herein, a content item is, includes, or otherwise refers to an item of content which may be visually represented in some way within a digital whiteboard. Examples of content items include, but are not limited to, text objects, such as text boxes and digital sticky notes, and non-text objects, such as illustrations and flowcharts.

Data of the digital whiteboard may be maintained within a data store (e.g., of the software platform 404). In particular, the digital whiteboard software 408 may maintain (e.g., store or cause to be stored) data indicative of content items of, locations of the content items within, comments of, and/or locations of the comments within the digital whiteboard along with data indicative of the respective users who added the content and/or comments. When the digital whiteboard is later accessed after an active digital whiteboard session between multiple participants terminates, the stored data are retrieved to cause the content items and/or comments to populate at their designated locations within the digital whiteboard.

Users of the participant devices 410 may have varying levels of access to functionality of the digital whiteboard based on their access privileges. In one particular example, the type of access privileges given to a user of a participant device 410 is based on their role with respect to the digital whiteboard. For example, an owner of the digital whiteboard (i.e., a person who created or who otherwise inherited master control of the digital whiteboard) may retain a highest level of access privileges allowing them to add, modify, and remove content items, comments, and the like without limitation. In another example, some users of participant devices 410 may have access privileges to add content items and to modify or remove the content items that they themselves added, but not to modify or remove content items from other users. In yet another example, some users of participant devices 410 may have comment-only or view-only access privileges preventing them from adding, modifying, or removing content items whatsoever while still allowing them to view the content items in the digital whiteboard.

Figure 5:
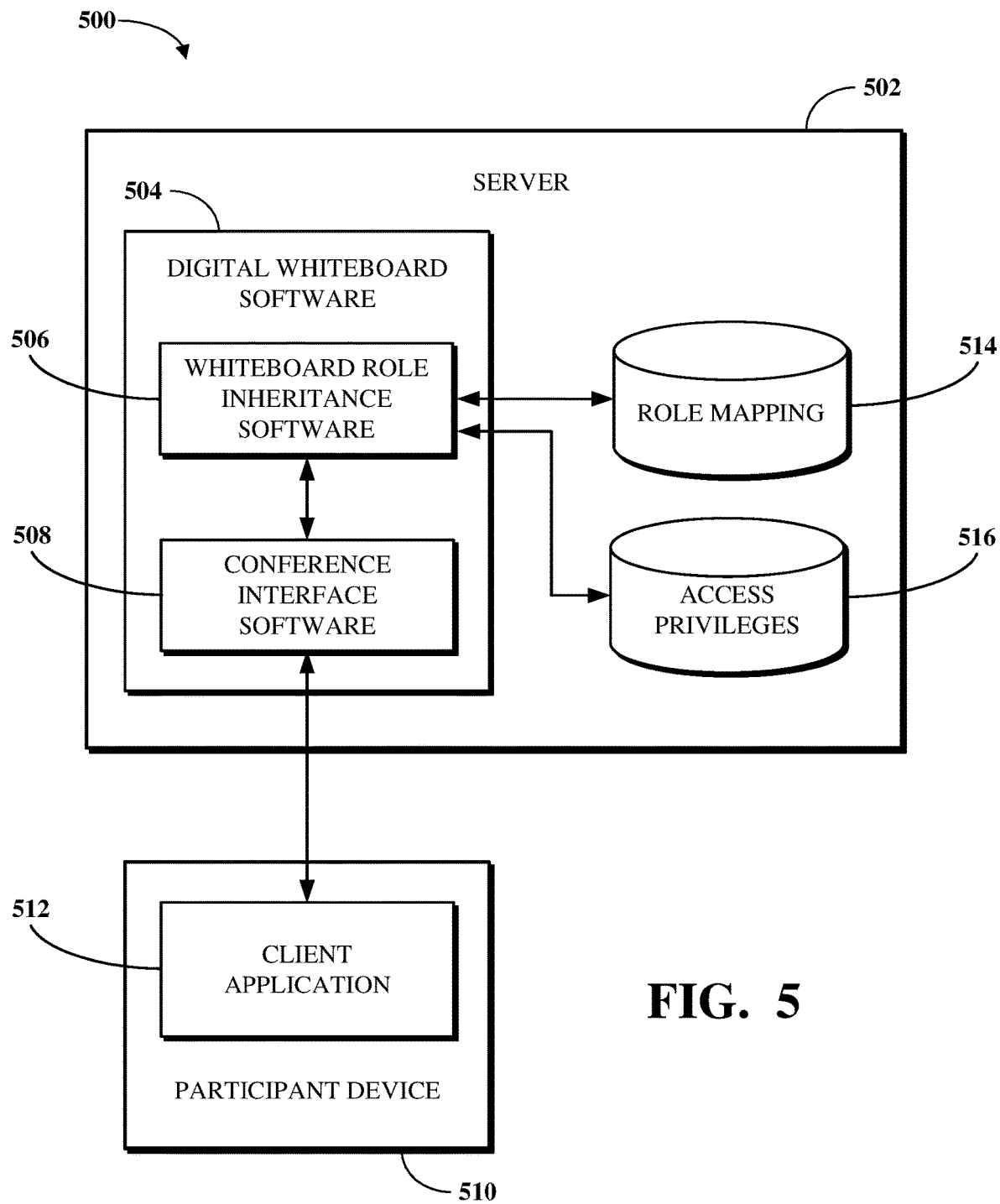
FIG. 5 is a block diagram of an example of a system for inheriting whiteboard roles for a digital whiteboard shared to a video conference based on conference roles of participants within the video conference.

FIG. 5 is a block diagram of an example of a system 500 for inheriting whiteboard roles for a digital whiteboard shared to a video conference based on conference roles of participants within the video conference. The system 500 may, for example, be the system 400 shown in FIG. 4. The system 500 includes a server 502 that runs digital whiteboard software 504, which may, for example, respectively be the server 404 and the digital whiteboard software 408 shown in FIG. 4. The digital whiteboard software 504 includes whiteboard role inheritance software 506 and conference interface software 508. The digital whiteboard software 504 implements a digital whiteboard which may be accessed by a user of a participant device 510, such as via a client application 512 running at the participant device 510, and facilitates an active digital whiteboard session for that digital whiteboard. The participant device may, for example, be one of the participant devices 410 shown in FIG. 4.

The whiteboard role inheritance software 506 determines whiteboard roles for participants of a video conference based on a request to share a digital whiteboard to the video conference. The whiteboard roles define the functionality of the digital whiteboard to which the participants of the video conference have access during an active digital whiteboard session for the digital whiteboard. Different functionality of the digital whiteboard is enabled for different whiteboard roles. As such, a first participant with a first whiteboard role will be able to access different functionality of a digital whiteboard than a second participant with a second whiteboard role. The whiteboard roles are inherited based on conference roles of the participants within the video conference to which the digital whiteboard is or otherwise will be shared.

The server 502 further includes a role mapping data store 514 and an access privileges data store 516. The role mapping data store 514 stores a mapping of conference roles to whiteboard roles. The mapping of conference roles to whiteboard roles is data, in one or more possible formats, which indicates which whiteboard roles should be assigned to a conference participant based on their conference role within a conference to which a digital whiteboard is shared. For example, the mapping may be expressed as or otherwise using a table, an array, comma separated values, or an object notation. The whiteboard role inheritance software 506 may access the role mapping data store 514 to determine a whiteboard role that maps to a conference role for a given participant of a video conference. For example, the whiteboard role inheritance software 506 may query the role mapping data store 514 using the conference role of the participant. The access privileges data store 516 stores data indicative of access privileges to assert for participants of a video conference based on the whiteboard roles determined for those participants. The functionality of the digital whiteboard associated with a whiteboard role is enabled by the digital whiteboard software 504 asserting access privileges determined using the access privileges data store 516. Thus, the access privileges represented in the access privileges data store 516 correspond to different functionality of the digital whiteboard which is accessible using different whiteboard roles.

The conference interface software 508 serves as an interface between participant devices connected to a video conference (e.g., implemented using the conferencing software 406 shown in FIG. 4) and the whiteboard role inheritance software 506. In particular, the conference interface software 508 is used to obtain information indicative of conference roles of individual video conference participants from the client applications running at their participant devices and to pass that obtained information to the whiteboard role inheritance software 506 for use in determining the whiteboard roles of the video conference participants. The conference interface software 508 obtains the information indicative of a conference role of a participant of a video conference based on the digital whiteboard software 504 receiving a request to share a digital whiteboard to the video conference. For example, upon the digital whiteboard software 504 receiving a request to share a digital whiteboard to a video conference, the client application 512 running at the participant device 510, which may be the same client application as is used to connect the participant device 510 to the video conference, may transmit the information indicative of the conference role of the user of the participant device 510 to the digital whiteboard software 504 for processing by the conference interface software 508.

The transmission of the information to the conference interface software 508 may be by way of a push mechanism, by which the client application 512 sends the information to the conference interface software 508. Alternatively, the transmission of the information to the conference interface software 508 may be by way of a pull mechanism, by which the conference interface software 508 retrieves the information from the client application 512. While the conference interface software 508 is shown separately from the whiteboard role inheritance software 506, in some implementations, the whiteboard role inheritance software 506 may include the conference interface software 508.

Figure 6:
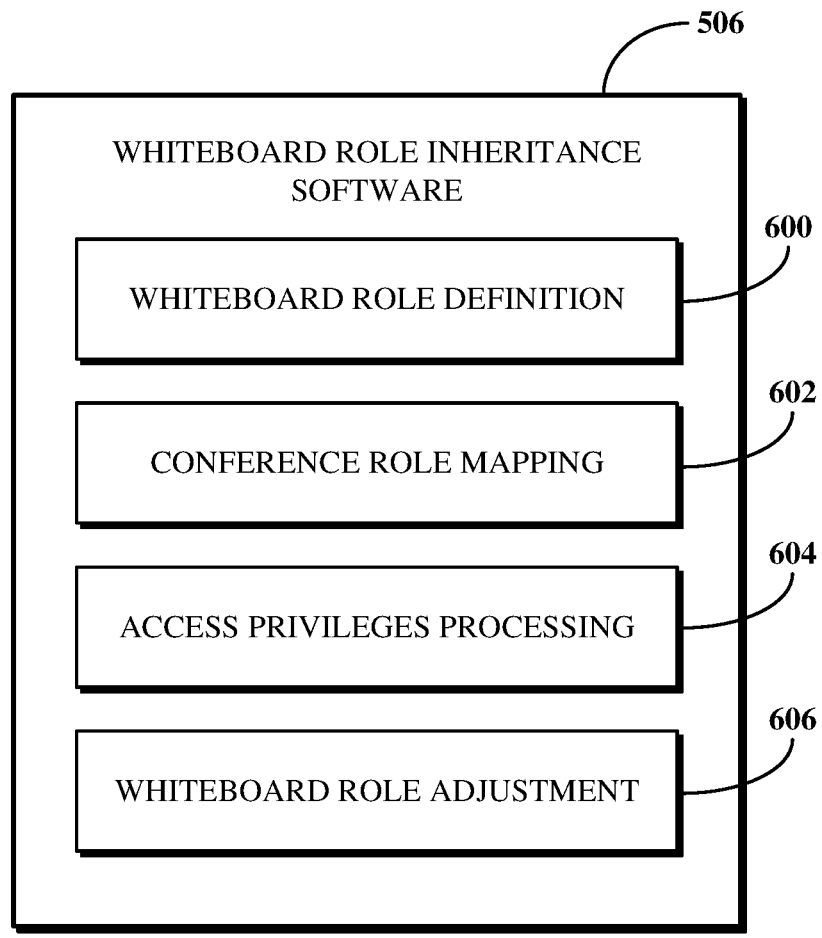
FIG. 6 is a block diagram of an example of whiteboard role inheritance software.

To further describe the whiteboard role inheritance software 506, reference is made to FIG. 6, which shows a block diagram of an example of the whiteboard role inheritance software 506. The whiteboard role inheritance software 506 includes tools, such as programs, subprograms, functions, routines, subroutines, operations, and/or the like, for determining, for participants of a video conference, whiteboard roles to inherit for a digital whiteboard shared to the video conference based on conference roles of the participants within the video conference. As shown, the whiteboard role inheritance software 506 includes a whiteboard role definition tool 600, a conference role mapping tool 602, an access privileges processing tool 604, and a whiteboard role adjustment tool 606.

The whiteboard role definition tool 600 defines whiteboard roles which may be determined for participants of a video conference to which a digital whiteboard is shared and determines access privileges for enabling access to functionality of the digital whiteboard according to those whiteboard roles. Examples of whiteboard roles which may be defined using the whiteboard role definition tool 600 include owner, co-owner, editor, commenter, and view-only. The access privileges represent instructions for enabling or disabling access to select functionality of the digital whiteboard. For example, the access privileges for the commenter role may be instructions for enabling the addition, modification, and/or removal of comments but disabling the addition, modification, and/or removal of content items. In some cases, one or more whiteboard roles which are typically available to digital whiteboards may be omitted from a list of whiteboard roles available to a given digital whiteboard. For example, where the digital whiteboard is marked as being confidential or otherwise is determined to include or correspond to sensitive material, the owner role may be omitted to prevent the access privileges associated with the owner role from being available to any participant of a video conference to which the digital whiteboard is shared.

The whiteboard role definition tool 600 may store data indicative of the defined whiteboard roles in a role mapping data store, for example, the role mapping data store 514 shown in FIG. 5. The whiteboard role definition tool 600 may store data indicative of the access privileges in an access privileges data store, for example, the access privileges data store 516 shown in FIG. 5. In some cases, the whiteboard roles defined and/or the access privileges determined using the whiteboard role definition software 600 are specific to a given digital whiteboard. In other cases, the whiteboard roles defined and/or the access privileges determined using the whiteboard role definition software 600 are defined and determined for use with multiple digital whiteboards. For example, the whiteboard roles and/or the access privileges may be defined and/or determined, respectively, for digital whiteboards created by users associated with a common domain, such as of a customer of a software platform. In either such case, the whiteboard roles are defined and the access privileges are determined before the digital whiteboard is shared to a video conference or based on a request to share a digital whiteboard to a video conference.

The access privileges determined for a given whiteboard role may be or include document-level functionality and/or session-level functionality. Thus, the functionality of the digital whiteboard to which access is enabled for a participant based on the whiteboard role determined for the participant may correspond to one or both of document-level functionality or session-level functionality. Examples of document-level functionality which may be enabled for a whiteboard role include viewing, adding, modifying, or removing content items of the digital whiteboard or viewing, adding, modifying, or removing comments of the digital whiteboard. Examples of session-level functionality which may be enabled for a whiteboard role include directing participant focus to a content item, setting a timer, requesting a participant vote, or initiating or terminating a content activity within the digital whiteboard. In some implementations, the access privileges for a given whiteboard role may be wholly or partially configurable. For example, the host of a video conference to which a digital whiteboard is or will be shared may reconfigure some or all of the access privileges for one or more whiteboard roles, such as to change the functionality of the digital whiteboard to which participants having those whiteboard roles will have access during an active digital whiteboard session.

The conference role mapping tool 602 determines mappings between conference roles for video conference participants and ones of the whiteboard roles determined using the whiteboard role definition tool 600. The conference role mapping tool 602 uses a list of conference roles for participants within a video conference to determine the mappings. Examples of the conference roles include host, co-host, presenter, and participant. In some cases, the conference roles may be based on a type or context of the video conference. For example, where the video conference is a webinar, the conference roles can be or include webinar roles. Examples of conference roles which may be used for a webinar include a panelist role (e.g., for a webinar participant who is sitting on a panel of speakers) and/or a questioner role (e.g., for a webinar participant who is asking a question to a webinar participant having the presenter role or the panelist role). However, where the video conference is a participant-to-participant video conference, the panelist role and the questioner role may be omitted.

The conference role mapping tool 602 may determine the mappings based on input obtained from a computing device, for example, a device of a user of conferencing software (e.g., the conferencing software 406) or a device of a developer or other operator of the conferencing software. For example, the user of the conferencing software may be an administrator of an account of a customer of a software platform who controls access to and use of the conferencing software by users associated with that account. In another example, the operator of the conferencing software may set the conference roles which are available to some or all users of the conferencing software across multiple customer accounts. Alternatively, the conference role mapping tool 602 may determine the mappings automatically (e.g., without manual user intervention) based on an inferred understanding of the conference roles. For example, the conference role mapping tool 602 may in some cases determine to map the host role for video conferences to the co-owner role for digital whiteboards to enable the host of a video conference to have a high level of control over an active digital whiteboard session during the video conference. In another example, the conference role mapping tool 602 may determine to map the presenter role for video conferences to the editor or commenter role for digital whiteboards to enable the presenter to control the content items or comments that are within the digital whiteboard during the active digital whiteboard session. In yet another example, the conference role mapping tool 602 may determine to map the participant role for video conferences to the view-only role for digital whiteboards to prevent participants in the view-only role from making changes to the digital whiteboard during an active digital whiteboard session. In some implementations, regardless of the manner by which the mappings between the whiteboard roles and the conference roles are determined, the mappings may be wholly or partially configurable. For example, the host of a video conference to which a digital whiteboard is or will be shared may in some cases reconfigure some or all of the mappings between the conference roles and the whiteboard roles for that specific video conference. In some implementations, regardless of a mapping of whiteboard roles to conference roles, where a participant of a video conference to which a digital whiteboard is shared already has a whiteboard role based on their having previously accessed the digital whiteboard before it is shared to the video conference, the participant may maintain that previously assigned whiteboard role instead of being assigned a new whiteboard role according to their conference role within the video conference.

The access privileges processing tool 604 determines a whiteboard role for a participant of a video conference based on a mapping between the whiteboard role and a conference role of the participant within the video conference. The access privileges processing tool 604 uses information indicative of a conference role of a video conference participant (e.g., obtained from a client application of a participant device used by that video conference participant) to query the data store that stores the mapping of conference roles to the whiteboard roles determined using the conference role mapping tool 602. The access privileges processing tool 604 then uses the whiteboard role determined for the video conference participant to determine the access privileges to assert for the video conference participant for the active whiteboard session during which the digital whiteboard is shared to the video conference. The access privileges processing tool 604 asserts those access privileges for that participant to enable access to certain functionality of the digital whiteboard for the participant during the active digital whiteboard session. Upon the access privileges being asserted, the participant is able to access the functionality which is associated therewith.

The whiteboard role adjustment tool 606 changes the access privileges which are asserted for one or more participants of a video conference to which a digital whiteboard is shared based. The changes may be based on a termination of an active digital whiteboard session for the digital whiteboard during the video conference or based on an instruction obtained from a participant device connected to the digital whiteboard. For example, upon the termination of the active digital whiteboard session, regardless of whether the video conference itself has been terminated, the whiteboard role adjustment tool 606 may revoke the access privileges previously asserted for the participants of the video conference. Revoking the access privileges for a participant includes disabling the access for that participant to the functionality of the digital whiteboard which is associated with the whiteboard role determined for that participant. In another example, a participant of the video conference (e.g., the host of the video conference or the owner of the digital whiteboard shared to the video conference) may, within the video conference or the digital whiteboard, indicate to change a whiteboard role previously determined for a participant of the video conference. For example, the indication may be to change a whiteboard role for a participant from the view-only role to the editor role to enable the participant to add, modify, and/or remove content items within the digital whiteboard. In another example, the indication may be to change a whiteboard role for a participant from the editor role to the commenter role based upon a portion of the active digital whiteboard session during which the participant was to add content items to the digital whiteboard having elapsed.

In some cases, a video conference to which a digital whiteboard is shared may be a recurring video conference (e.g., a daily, weekly, biweekly, or monthly video conference). In such a case, where the whiteboard role adjustment tool 606 changes the access privileges for a participant of the video conference, data indicative of the change may be stored for later use in further occurrences of the video conference. For example, data indicative of the new whiteboard role to which a participant is changed may be stored in a data store. Upon a next occurrence of the recurring video conference, the whiteboard role inheritance software 506 may search for data stored in that data store indicative of changes to whiteboard roles and use them to assert access privileges for the subject participants during that next occurrence of the video conference.

Although the tools 600 through 606 are shown as separate tools, in some implementations, two or more of the tools 600 through 606 may be combined into a single tool. Although the tools 600 through 606 are shown as functionality of the whiteboard role inheritance software 506 as a single piece of software, in some implementations, some or all of the tools 600 through 606 may exist outside of the whiteboard role inheritance software 506. Similarly, in some implementations, a software service using the whiteboard role inheritance software 506 (e.g., the digital whiteboard software 408 or the conferencing software 406) may exclude the whiteboard role inheritance software 506 while still including the some or all of tools 600 through 606 in some form elsewhere or otherwise make use of the tools 600 through 606 while some or all of the tools 600 through 606 are included in some form elsewhere.

In some implementations, the whiteboard role inheritance software 506 may include tools other than the tools 600 through 606, such as in addition to or instead of one or more of the tools 600 through 606. In some implementations, the whiteboard role inheritance software 506 can include a conference role update tool for causing a change in conference role for a participant accessing a digital whiteboard shared to a video conference. The conference role update tool may transmit an instruction to conferencing software used to implement the video conference (e.g., via the conference interface software 508 shown in FIG. 5) to change the conference role for a participant of the video conference. The change in the conference role may be based on input obtained from a user of a participant device connected to the digital whiteboard or automatic, such as without manual user intervention. For example, the input may be obtained from a device of a host of the video conference and indicate to change a conference role for an owner of the digital whiteboard to the co-host role. In another example, the owner of the digital whiteboard may be automatically changed to the co-host role for the video conference upon the host of the video conference being given the co-owner role for the digital whiteboard while the digital whiteboard is shared to the video conference. In yet another example, the owner of the digital whiteboard may be automatically changed to the presenter role for the video conference based upon a request to share the digital whiteboard to the video conference having been received from a device of the owner of the digital whiteboard.

In some implementations, the whiteboard role inheritance software 506 may include a calendar integration tool for causing whiteboard roles to be determined for users of a calendar system upon a video conference to which a digital whiteboard will be shared being scheduled. For example, the whiteboard role inheritance software 506 may integrate with calendaring software (e.g., of a software platform which includes the digital whiteboard software 504) to listen for video conferences which are scheduled to use a digital whiteboard. The use of a digital whiteboard during a video conference under scheduling may, for example, be indicated as an option in a form of the calendaring software selectable when the video conference is being scheduled or based on a link to the digital whiteboard being included in the event created for scheduling the video conference. The calendar integration tool may be used to determine conference roles for participants invited to the conference participant based on an indication of those roles within the event created for scheduling the video conference, based on information identifying the party or parties who caused the event to be created, and/or based on directory or other organizational information identifying positions of the invited participants within an entity (e.g., identifying a participant as an officer of the entity versus an associate or contractor).

Figure 7:
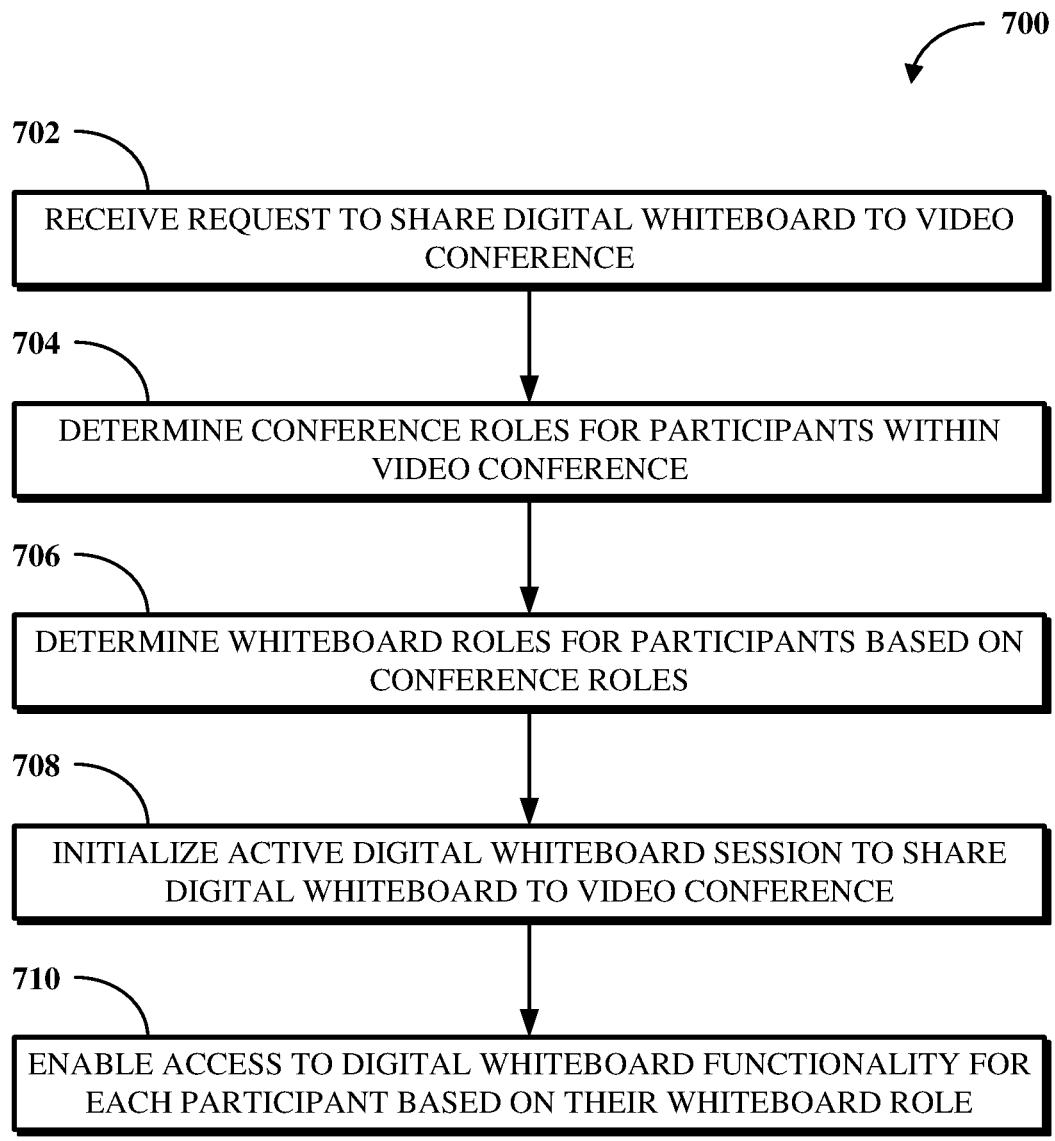
FIG. 7 is a flowchart of an example of a technique for inheriting whiteboard roles for a digital whiteboard shared to a video conference based on conference roles of participants within the video conference.
Figure 8:
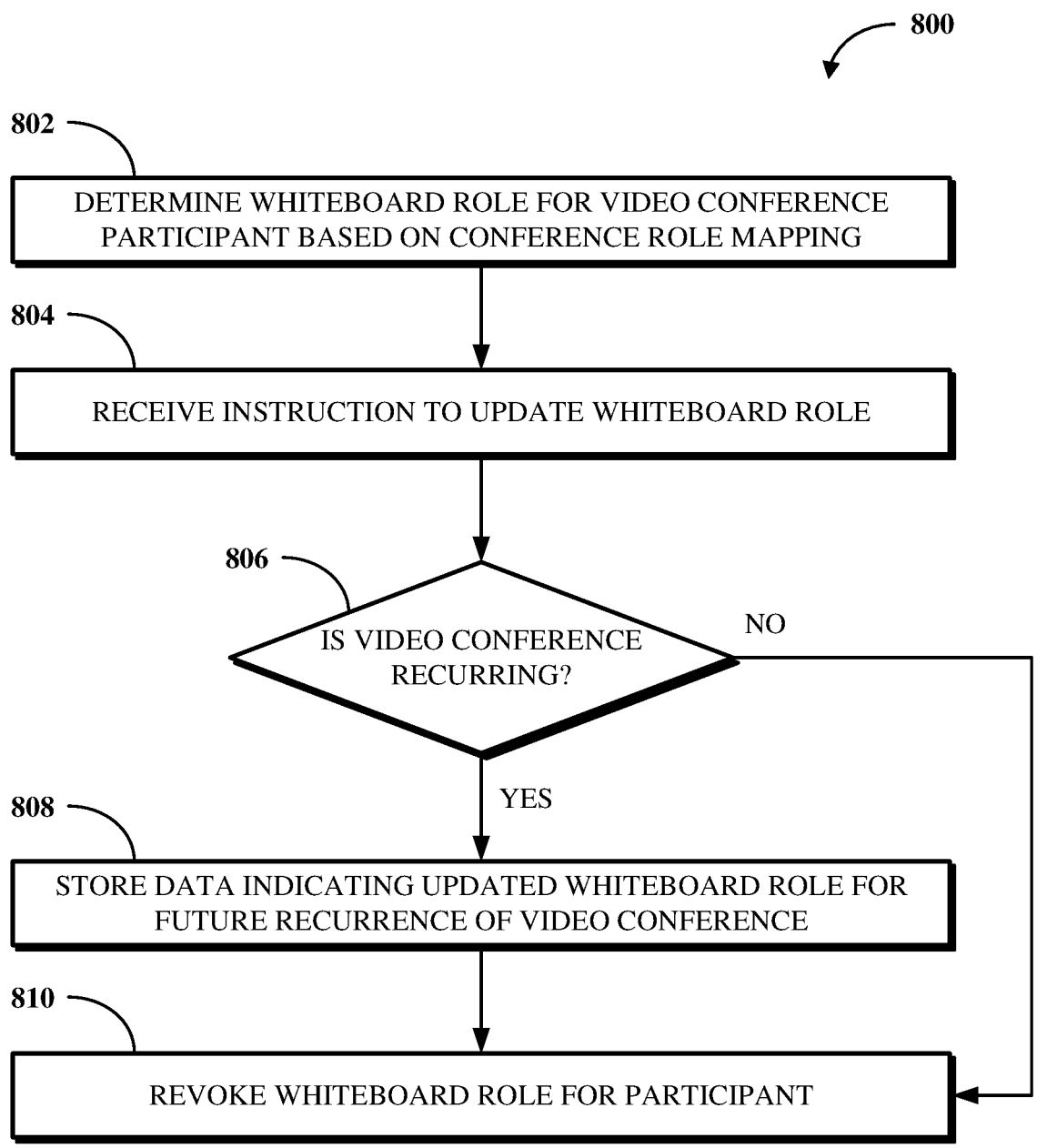
FIG. 8 is a flowchart of an example of a technique for updating a whiteboard role for a participant of a video conference during an active digital whiteboard session.

To further describe some implementations in greater detail, reference is next made to examples of techniques which may be performed by or using a system for inheriting whiteboard roles for a digital whiteboard shared to a video conference based on conference roles of participants within the video conference. FIG. 7 is a flowchart of an example of a technique 700 for inheriting whiteboard roles for a digital whiteboard shared to a video conference based on conference roles of participants within the video conference. FIG. 8 is a flowchart of an example of a technique 800 for updating a whiteboard role for a participant of a video conference during an active digital whiteboard session.

The technique 700 and/or the technique 800 can be executed using computing devices, such as the systems, hardware, and software described with respect to FIGS. 1-6. The technique 700 and/or the technique 800 can be performed, for example, by executing a machine-readable program or other computer-executable instructions, such as routines, instructions, programs, or other code. The steps, or operations, of the technique 700, the technique 800, and/or another technique, method, process, or algorithm described in connection with the implementations disclosed herein can be implemented directly in hardware, firmware, software executed by hardware, circuitry, or a combination thereof.

For simplicity of explanation, the technique 700 and the technique 800 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Referring first to FIG. 7, the technique 700 for inheriting whiteboard roles for a digital whiteboard shared to a video conference based on conference roles of participants within the video conference is shown. At 702, a request to share a digital whiteboard to a video conference is received. The request is received from a device of a participant of the video conference while the video conference is ongoing. For example, the request may be initiated using a meeting control within a user interface of a client application connecting the device of the participant to conferencing software that implements the video conference. In another example, the request may be initiated within a user interface of the client application outside of the video conference, such as a user interface associated with digital whiteboard software that implements the digital whiteboard. In some implementations, the request to share the digital whiteboard to the video conference may be received before the video conference has started. For example, the request to share the digital whiteboard to the video conference may include a request to initialize a video conference between participants to an active digital whiteboard session for the digital whiteboard. In such a case, the request to share the digital whiteboard to the video conference may be initiated within a user interface of the digital whiteboard software.

At 704, conference roles for the participants within the video conference are determined. The conference roles are determined for the participants based on the request to share the digital whiteboard to the video conference. Determining the conference role for a participant of the video conference includes obtaining information identifying the conference role from a client application running at a device of the participant and used to connect the device of the participant to the video conference. For example, the conferencing software implementing the video conference or the digital whiteboard software implementing the digital whiteboard may transmit a request for the information identifying the conference role to the client application of each participant of the video conference based on the request to share the digital whiteboard to the video conference.

At 706, whiteboard roles are determined for the participants based on the conference roles. The whiteboard role for each participant is determined using a mapping of conference roles to whiteboard roles. For example, determining the whiteboard role for a participant of the video conference can include accessing data indicative of a mapping of the conference role of the participant to a whiteboard role and determining the whiteboard role for the participant using the accessed data. The mapping of conference roles to whiteboard roles is determined based on similarities between those roles. For example, the participant role of the conference roles is similar to the view-only role of the whiteboard roles in that each yields a least amount of control over the video conference or digital whiteboard. In another example, the host role of the conference roles is similar to the owner role of the whiteboard roles in that each yields a highest amount of control over the video conference or digital whiteboard.

At 708, an active digital whiteboard session is initialized to share the digital whiteboard to the video conference. The active digital whiteboard session is initialized within a user interface of the video conference. For example, the active digital whiteboard session may be presented within a graphical user interface of the video conference to cause the digital whiteboard to appear as shared content within the video conference. Alternatively, the active digital whiteboard session may be initialized within a user interface other than of the video conference. For example, client applications running at the devices of the participants of the video conference may open a new window to connect the devices to the active digital whiteboard session and output the digital whiteboard for display.

At 710, access to functionality of the digital whiteboard is enabled for each participant of the video conference based on the whiteboard role determined for the participant. In particular, for each participant during the video conference, access to functionality of the digital whiteboard corresponding to the whiteboard role determined for the participant is enabled. Enabling access to functionality of the digital whiteboard corresponding to a whiteboard role determined for a participant of a video conference includes determining the access privileges which are associated with the whiteboard role and asserting those access privileges against the digital whiteboard to cause the functionality of the digital whiteboard associated therewith to become accessible at the device of the participant. Different functionality of the digital whiteboard is enabled for different whiteboard roles. As such, a participant of the video conference with a first whiteboard role will have access to different functionality of the digital whiteboard than a participant of the video conference with a second whiteboard role; however, the functionality accessible to participants with different whiteboard roles may overlap. For example, the functionality accessible to a participant with the commenter role and the functionality accessible to a participant with the editor role both allow each participant to add, modify, and/or remove comments within the digital whiteboard, but the editor role allows the subject participant to also add, modify, and/or remove content items within the digital whiteboard while the commenter role does not. The access to the functionality of the digital whiteboard is automatically enabled for a participant upon the assertion of the access privileges associated with the whiteboard role determined for that participant. The functionality of the digital whiteboard to which access is enabled for a participant based on the whiteboard role determined for the participant corresponds to one or both of document-level functionality or session-level functionality. For example, the document-level functionality may correspond to one or more of viewing, adding, modifying, or removing content items of the digital whiteboard. In another example, the session-level functionality may correspond to one or more of directing participant focus to a content item, setting a timer, requesting a participant vote, or initiating or terminating a content activity within the digital whiteboard.

In some implementations, the technique 700 can include terminating the access to the functionality of the digital whiteboard enabled for one or more of the participants. For example, the access to the functionality of the digital whiteboard enabled for at least some of the participants of the video conference can be terminated upon an end of the video conference. In another example, the access to the functionality of the digital whiteboard enabled for at least some of the participants of the video conference can be terminated upon an end of the active digital whiteboard session during which the digital whiteboard is shared to the video conference.

Referring next to FIG. 8, the technique 800 for updating a whiteboard role for a participant of a video conference during an active digital whiteboard session is shown. At 802, a whiteboard role is determined for a participant of a video conference based on a mapping of conference roles to whiteboard roles. As described above with respect to the operations at 706 of the technique 700 shown in FIG. 7, the whiteboard role for each participant is determined using a mapping of conference roles to whiteboard roles. For example, determining the whiteboard role for a participant of the video conference can include accessing a data store that stores a mapping of the conference roles to the whiteboard roles and querying the data store based on a conference role for a participant of the video conference to determine the whiteboard role that is mapped to that conference role.

At 804, an instruction is received to update the whiteboard role determined for the participant. The instruction may, for example, be received from a device of a participant of the video conference. For example, the instruction may be received from a device used by an owner of the digital whiteboard. The instruction indicates to update the whiteboard role by changing the whiteboard role to something different, in order to change the functionality of the digital whiteboard to which access is enabled for the participant. For example, the instruction may indicate to change the whiteboard role for the participant to a different whiteboard role to allow the participant to have increased control over the digital whiteboard. In another example, the instruction may indicate to change the whiteboard role for the participant to a different whiteboard role to restrict the participant to decreased control over the digital whiteboard. Based on the instruction, the whiteboard role for the participant is changed while the digital whiteboard is shared to the video conference.

At 806, at some point after the whiteboard role for the participant is updated based on the instruction received at 804, a determination is made as to whether the video conference is a recurring video conference. Determining whether the video conference is a recurring video conference can include using an integration with calendaring software used to schedule the video conference to determine whether the video conference was scheduled with multiple occurrences in which at least sone of those multiple occurrences is set for a future date.

If, at 806, a determination is made that the video conference is a recurring video conference, then, at 808, data indicative of the updated whiteboard role is stored for future recurrences of the video conference. For example, the data indicative of the updated whiteboard role may be stored in connection with the digital whiteboard, such as within a data store accessible to the digital whiteboarding software that implements the digital whiteboard. In another example, the data indicative of the updated whiteboard role may be stored in connection with the video conference, such as within a data store accessible to the conferencing software that implements the video conference. The data is stored so that it can be easily recalled and used during one or more future occurrences of the recurring video conference to identify the updated whiteboard role as the whiteboard role to determine for the subject participant. Thus, in some cases where the video conference is set to recur, the whiteboard roles may be temporarily enforced, based on the stored data, during each future occurrence of the video conference.

At 810, the whiteboard role determined for the participant is revoked. Revoking the whiteboard role determined for a participant of the video conference includes revoking the access privileges associated with that whiteboard role to disable access to the subject functionality of the digital whiteboard by the participant. The whiteboard role may be revoked at a termination of the active digital whiteboard session initialized for the digital whiteboard during the video conference. Alternatively, the whiteboard role may be revoked at an end of the video conference. In either case, the whiteboard roles may be revoked for all participants or only for some participants. For example, an owner of the digital whiteboard may designate to maintain, as permanent, the whiteboard role determined for one or more of the participants, such as where the owner of the digital whiteboard seeks further assistance with the digital whiteboard by those one or more participants.

If, at 806, a determination is made that the video conference is not a recurring video conference, the technique 800 skips the operations at 808 and instead proceeds directly to 810, at which the whiteboard role determined for the participant is revoked.

In some implementations, the technique 700 shown in FIG. 7 and the technique 800 shown in FIG. 8 may be combined into a single technique. For example, the operations at 804, 806, 808, and 810 may be performed after the operations at 710 are performed. In at least some such cases, the operations at 802 may represent or otherwise correspond to some or all of the operations at 702, 704, 706, and 708.

The implementations of this disclosure describe methods, systems, devices, apparatuses, and non-transitory computer readable media for automated rearrangement of content within a digital collaboration space. In some implementations, a method comprises, a non-transitory computer readable medium stores instructions operable to cause one or more processors to perform operations comprising, and/or an apparatus comprises a memory and a processor configured to execute instructions stored in the memory for: determining, based on a request to share a digital whiteboard to a video conference, a whiteboard role for each participant of the video conference based on a conference role of the participant within the video conference; and enabling, for each participant during the video conference, access to functionality of the digital whiteboard corresponding to the whiteboard role determined for the participant, wherein different functionality of the digital whiteboard is enabled for different whiteboard roles.

In some implementations of the method, the non-transitory computer readable medium, and/or the apparatus, the method comprises, the operations comprise, and/or the processor is configured to execute the instructions for: terminating the access to the functionality of the digital whiteboard enabled for at least some of the participants of the video conference upon an end of the video conference.

In some implementations of the method, the non-transitory computer readable medium, and/or the apparatus, the method comprises, the operations comprise, and/or the processor is configured to execute the instructions for: terminating the access to the functionality of the digital whiteboard enabled for at least some of the participants of the video conference upon an end of an active digital whiteboard session during which the digital whiteboard is shared to the video conference.

In some implementations of the method, the non-transitory computer readable medium, and/or the apparatus, an owner of the digital whiteboard retains a whiteboard role enabling a highest access to the functionality of the digital whiteboard.

In some implementations of the method, the non-transitory computer readable medium, and/or the apparatus, the method comprises, the operations comprise, and/or the processor is configured to execute the instructions for: determining mappings of ones of the conference roles to ones of the whiteboard roles.

In some implementations of the method, the non-transitory computer readable medium, and/or the apparatus, the method comprises, the operations comprise, and/or the processor is configured to execute the instructions for: changing a whiteboard role for a participant while the digital whiteboard is shared to the video conference.

In some implementations of the method, the non-transitory computer readable medium, and/or the apparatus, the functionality of the digital whiteboard to which access is enabled for a participant based on the whiteboard role determined for the participant corresponds to one or both of document-level functionality or session-level functionality.

In some implementations of the method, the non-transitory computer readable medium, and/or the apparatus, the video conference is set to recur, and the whiteboard roles are temporarily enforced during each future occurrence of the video conference.

In some implementations of the method, the non-transitory computer readable medium, and/or the apparatus, a mapping of conference roles to whiteboard roles is used to determine the whiteboard role for each participant.

In some implementations of the method, the non-transitory computer readable medium, and/or the apparatus, the whiteboard role for a participant is revoked while the digital whiteboard is shared to the video conference to revoke the access to the functionality of the digital whiteboard for the participant.

In some implementations of the method, the non-transitory computer readable medium, and/or the apparatus, the functionality of the digital whiteboard to which access is enabled for a participant based on the whiteboard role determined for the participant corresponds to document-level functionality including one or more of viewing, adding, modifying, or removing content items of the digital whiteboard.

In some implementations of the method, the non-transitory computer readable medium, and/or the apparatus, the functionality of the digital whiteboard to which access is enabled for a participant based on the whiteboard role determined for the participant corresponds to session-level functionality including one or more of directing participant focus to a content item, setting a timer, requesting a participant vote, or initiating or terminating a content activity within the digital whiteboard.

In some implementations of the method, the non-transitory computer readable medium, and/or the apparatus, determining the whiteboard role for a participant comprises: determining the conference role of the participant; accessing data indicative of a mapping of the conference role to the whiteboard role; and determining the whiteboard role using the accessed data.

In some implementations of the method, the non-transitory computer readable medium, and/or the apparatus, the whiteboard role is associated with access privileges for using at least a subset of the functionality of the digital whiteboard and the conference role is associated with access privileges for using at least a subset of functionality of the video conference.

In some implementations of the method, the non-transitory computer readable medium, and/or the apparatus, the whiteboard role determined for each participant is maintained only while the video conference remains ongoing.

In some implementations of the method, the non-transitory computer readable medium, and/or the apparatus, the whiteboard role determined for each participant is maintained only while the digital whiteboard remains shared to the video conference.

In some implementations of the method, the non-transitory computer readable medium, and/or the apparatus, the request to share the digital whiteboard to the video conference occurs before the video conference begins.

In some implementations of the method, the non-transitory computer readable medium, and/or the apparatus, while the digital whiteboard is shared to the video conference, the conference role for an owner of the digital whiteboard is a co-host role to enable the owner of the digital whiteboard to control functionality of the video conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining, based on a request to share a digital whiteboard to a video conference, a whiteboard role for each participant of multiple participants of the video conference based on a conference role of the participant within the video conference;
   causing a participant device connected to the video conference for each participant to render the digital whiteboard within a graphical user interface associated with the video conference;
   enabling, for each participant during the video conference, access to functionality of the digital whiteboard corresponding to the whiteboard role determined for the participant, wherein different functionality of the digital whiteboard is enabled for different whiteboard roles;
   terminating the access to the functionality of the digital whiteboard for a first group of the participants of the video conference upon an end of the video conference and while the digital whiteboard is still active; and
   terminating the access to the functionality of the digital whiteboard for a second group of the participants of the video conference upon a termination of the digital whiteboard after the end of the video conference.

2. The method of claim 1, wherein an owner of the digital whiteboard retains a whiteboard role enabling a highest access to the functionality of the digital whiteboard.

3. The method of claim 1, comprising:
   determining mappings of ones of the conference roles to ones of the whiteboard roles.

4. The method of claim 3, wherein the mappings are automatically determined based on an inferred understanding of the conference roles.

5. The method of claim 1, comprising:
   changing a whiteboard role for a participant while the digital whiteboard is shared to the video conference.

6. The method of claim 1, wherein the functionality of the digital whiteboard to which access is enabled for a participant based on the whiteboard role determined for the participant corresponds to one or both of document-level functionality or session-level functionality.

7. The method of claim 1, wherein the video conference is set to recur, and wherein the whiteboard roles are temporarily enforced during each future occurrence of the video conference.

8. The method of claim 1, wherein the whiteboard role determined for a first participant is fixed, granting permanent access to the functionality of the digital whiteboard to the first participant.

9. The method of claim 1, wherein each participant that has accessed the digital whiteboard prior to the video conference maintains access privileges corresponding to a prior whiteboard role.

10. A non-transitory computer readable medium storing instructions operable to cause one or more processors to perform operations comprising:
    determining, based on a request to share a digital whiteboard to a video conference, a whiteboard role for each participant of multiple participants of the video conference based on a conference role of the participant within the video conference;

causing a participant device connected to the video conference for each participant to render the digital whiteboard within a graphical user interface associated with the video conference;

enabling, for each participant during the video conference, access to functionality of the digital whiteboard corresponding to the whiteboard role determined for the participant, wherein different functionality of the digital whiteboard is enabled for different whiteboard roles;

terminating the access to the functionality of the digital whiteboard for a first group of the participants of the video conference upon an end of the video conference while the digital whiteboard is still active; and terminating the access to the functionality of the digital whiteboard for a second group of the participants of the video conference upon a termination of the digital whiteboard after the end of the conference.

11. The non-transitory computer readable medium of claim 10, wherein a mapping of conference roles to whiteboard roles is used to determine the whiteboard role for each participant.

12. The non-transitory computer readable medium of claim 10, wherein the whiteboard role for a participant is revoked while the digital whiteboard is shared to the video conference to revoke the access to the functionality of the digital whiteboard for the participant.

13. The non-transitory computer readable medium of claim 10, wherein the functionality of the digital whiteboard to which access is enabled for a participant based on the whiteboard role determined for the participant corresponds to document-level functionality including one or more of viewing, adding, modifying, or removing content items of the digital whiteboard.

14. The non-transitory computer readable medium of claim 10, wherein the functionality of the digital whiteboard to which access is enabled for a participant based on the whiteboard role determined for the participant corresponds to session-level functionality including one or more of directing participant focus to a content item, setting a timer, requesting a participant vote, or initiating or terminating a content activity within the digital whiteboard.

15. An apparatus, comprising:
a memory; and
a processor configured to execute instructions stored in the memory to:

determine, based on a request to share a digital whiteboard to a video conference, a whiteboard role for each participant of multiple participants of the video conference based on a conference role of the participant within the video conference;

cause a participant device connected to the video conference for each participant to render the digital whiteboard within a graphical user interface associated with the video conference;

enable, for each participant during the video conference, access to functionality of the digital whiteboard corresponding to the whiteboard role determined for the participant, wherein different functionality of the digital whiteboard is enabled for different whiteboard roles;

terminate the access to the functionality of the digital whiteboard for a first group of the participants of the video conference upon an end of the video conference while the digital whiteboard is still active; and terminate the access to the functionality of the digital whiteboard for a second group of the participants of the video conference upon a termination of the digital whiteboard after the end of the video conference.

16. The apparatus of claim 15, wherein, to determine the whiteboard role for a participant, the processor is configured to execute the instructions to:
determine the conference role of the participant;
access data indicative of a mapping of the conference role to the whiteboard role; and
determine the whiteboard role using the accessed data.

17. The apparatus of claim 15, wherein the whiteboard role is associated with access privileges for using at least a subset of the functionality of the digital whiteboard and the conference role is associated with access privileges for using at least a subset of functionality of the video conference.

18. The apparatus of claim 15, wherein the whiteboard role determined for each participant is maintained only while the digital whiteboard remains shared to the video conference.

19. The apparatus of claim 15, wherein the request to share the digital whiteboard to the video conference occurs before the video conference begins.

20. The apparatus of claim 15, wherein, while the digital whiteboard is shared to the video conference, the conference role for an owner of the digital whiteboard is a co-host role to enable the owner of the digital whiteboard to control functionality of the video conference.

* * * * *